United States Patent [19]

Pagilagan

[11] 4,360,616

[45] Nov. 23, 1982

[54] FLAME-RETARDANT POLYAMIDE COMPOSITIONS

[75] Inventor: Rolando U. Pagilagan, Parkersburg, W. Va.

[73] Assignee: E. I. Du Pont de Nemours and Company, Wilmington, Del.

[21] Appl. No.: 221,888

[22] Filed: Dec. 31, 1980

[51] Int. Cl.³ .............................................. C08K 5/34
[52] U.S. Cl. ..................................... 524/100; 524/101; 524/102; 524/405; 524/432; 524/467; 524/514
[58] Field of Search .................. 260/37 N, 45.8 NT; 525/178; 524/100, 101, 102, 405, 432, 467, 514

[56] References Cited

U.S. PATENT DOCUMENTS

| 3,660,344 | 5/1972 | Michael et al. | 260/37 N |
| 3,663,495 | 5/1972 | Mic hael et al. | 260/37 N |
| 4,105,621 | 8/1978 | Maslen et al. | 260/37 N |
| 4,137,212 | 1/1979 | Theysohn et al. | 260/37 N |

FOREIGN PATENT DOCUMENTS

| 48-8028187 | 12/1973 | Japan | 260/37 N |
| 53-4113647 | 2/1978 | Japan | 260/37 N |

*Primary Examiner*—J. Ziegler

[57] ABSTRACT

A flame-retardant polyamide composition is described which has good arc tracking resistance. The composition is comprised of a polyamide, a selected organic flame-retardant, melamine or derivative, zinc borate or oxide and glass fiber.

9 Claims, No Drawings

FLAME-RETARDANT POLYAMIDE COMPOSITIONS

FIELD OF THE INVENTION

This invention relates to flame-retardant polyamide compositions, and, more particularly, to glass-reinforced, flame-retardant polyamide compositions having good arc tracking resistance.

BACKGROUND OF THE INVENTION

U.S. Pat. No. 4,105,621 to Maslen et al. (ICI) described glass-reinforced, flame-retardant polyamide molding compositions that are resistant to arcing, i.e., to carbonization during electrical discharge, that occurs through leaking of electrical current. The patent states that one component, zinc borate, should be present in an amount of at least 5% by weight and preferably at least 7% (See column 2, lines 7-26), and also states that 5-30% of a halogenated flame retardant should be present.

It is desirable to reduce the amount of organic halogenated flame retardant and inorganic zinc borate in the composition without impairing arc tracking resistance. Organic halogenated materials are known to give off corrosive gaseous decomposition products during processing, and zinc borate detrimentally affects properties.

SUMMARY OF THE INVENTION

It has now been found that the amount of halogenated organic flame retardant and zinc borate present can be reduced if melamine or a selected derivative thereof is present in the composition. In addition, presence of melamine permits replacement of zinc borate with zinc oxide.

Specifically, the composition of this invention is a reinforced, flame-retardant, arc track resistant composition consisting essentially of (a) 40-65 weight percent of composition of a polyamide of film-forming molecular weight,
(b) 16-35 weight percent of composition of melamine, melam, melamine cyanurate or a melamine derivative,
(c) 1-7 weight percent of composition selected from the class consisting of a chlorinated compound obtained from condensation of two moles of perchlorocyclopentadiene and one mole of 1,5-cyclooctadiene, or a brominated polystyrene.
(d) 1-4.9 weight percent of composition of zinc borate or zinc oxide
(e) 5-30 weight percent of composition of glass fibers, the percent amounts of components (a) through (e) totaling 100% with respect to one another.

DESCRIPTION OF THE INVENTION

The polyamides useful herein are well known in the art. They are thermoplastic, and are of film-forming molecular weight, i.e., have a number average molecular weight over 5000. The polyamide resin can be produced by condensation of equimolar amounts of a saturated organic dicarboxylic acid containing from 4-12 carbon atoms with an organic diamine containing 2-13 carbon atoms, in which the diamine can be employed, if desired, to provide an excess of amine end groups over carboxyl end groups in the polyamide. Vice versa, the diacid can be used to provide an excess of acid groups. Equally well, these polyamides may be made from acid-forming and amine-forming derivatives of said amines and acids such as esters, acid chlorides, amine salts, etc. Representative dicarboxylic acids used to make the polyamides include adipic acid, pimelic acid, suberic acid, sebacic acid, and dodecanedioic acid, while representative diamines include hexamethylenediamine and octamethylenediamine. In addition, the polyamide can also be prepared from self-condensation of a lactam. Examples of polyamides include polyhexamethylene adipamide (66 nylon), polyhexamethylene azelaamide (69 nylon), polyhexamethylene sebacamide (610 nylon), and polyhexamethylene dodecanoamide (612 nylon), poly bis-(4-aminocyclohexyl)methane dodecanoamide, or the polyamides produced by ring opening of lactams; i.e., polycaprolactam, (6 nylon), polylauric lactam, or poly-11-aminoundecanoic acid. It is also possible to use polyamides prepared by the polymerization of at least two of the amines or acids used to prepare the above polymers, as for example, a polymer made of adipic acid, and isophthalic acid and hexamethylene diamine. Blends of polyamides, such as a mixture of 66 nylon and 6 nylon are also included. Preferably the condensation polyamide employed herein is polyhexamethylene adipamide (66 nylon), or a blend of polyhexamethylene adipamide (66 nylon) and polycaprolactam (6 nylon). The polyamide is present in an amount of between 40-65 percent, preferably 40-55 percent, based on the weight of components (a)-(e).

Melamine has the formula

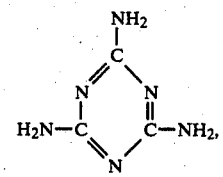

while melam has the formula

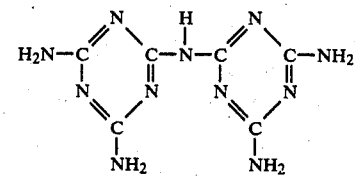

and melamine cyanurate is prepared by reaction of melamine with cyanuric acid. Cyanuric acid has the formula

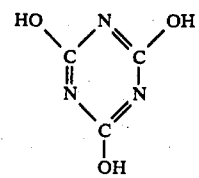

The melamine derivatives are represented by the formula

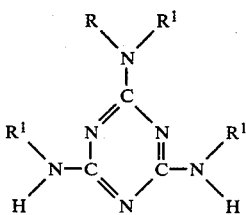

where R and R[1] may be same or different and represent hydrogen, lower alkyl (alkyl of 1-6 carbons), phenyl, tolyl or halo-phenyl, provided that not all the R and R[1] can be hydrogen.

These melamine compounds are present in an amount of 16-35 percent, preferably 20-29 percent, based on weight of components (a)-(e).

The chlorine-containing flame retardant is represented by the formula

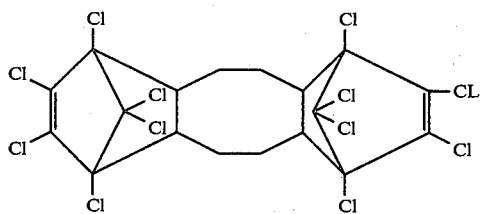

The brominated polystyrene should contain at least 40% bromine by weight preferably at least 60% bromine and should have a molecular weight of at least 5000. These flame retardants are present in an amount of 1-7 percent, preferably 2-5 percent, based on weight of components (a)-(e). If more than 7% is present arc track resistance of the composition begins to decrease.

The zinc borate should be stable at the processing temperature, i.e., molding temperature, of the polyamide. By stable is meant that evolution of volatiles is not significant. The preferred form of zinc borate is of the form $2ZnO.3B_2O_3xH_2O$, where x is between 3.3 and 3.7. This material does not tend to lose water below 300° C. The higher hydrates for example $2ZnO.3B_2O_3.7H_2O$ and $2ZnO.3B_2O_3.9H_2O$, lose water below the processing temperatures of most polyamides and are therefore preferably used with low melting point polyamides. Anhydrous zinc borate may be used if desired. The zinc borate or zinc oxide is present in an amount of 1-4.9 percent, preferably 2-4 percent, based on weight of compounds (a)-(e).

The glass fibers employed may be any commercially available glass fiber used for plastic molding resin reinforcement. The glass fiber can be present in an amount of 5-30 percent, preferably 15-25 percent, based on weight of components (a)-(e).

The effect of the presence of melamine or its derivatives is two-fold. It aids in improving arc tracking resistance while aiding in maintaining good flame retardancy, and it permits less zinc borate or oxide and less halogenated flame retardant to be present.

The compositions of the invention are conveniently made by mechanically blending the polyamide, the glass fibers, the halogen-containing flame retardant, the melamine, and the zinc borate or oxide. One method of obtaining an intimate blend of the composition in granule form involves the use of a screw extruder to intimately mix the mechanical blend in molten polyamide, subsequently extruding the mixture and chopping the extrudate into granule form. The ingredients fed to the extruder may consist of a simple tumbled blend of the ingredients or the components may be individually metered to the extruder. When using the preferred hydrated form of zinc borate care should be taken to reduce shear heating in the extruder to a minimum to avoid decomposition of the hydrate.

The compositions of the invention may include various other additives such as pigments, dyes, antioxidants, light and heat stabilizers and nucleating agents. It should be noted that these ingredients, particularly pigments, may have some effect on the specified properties, particularly arc tracking resistance, and it may be necessary to carry out some slight adjustment of the active ingredient concentration in the composition to compensate for such change. Lubricants which improve the ease of dispersion of the ingredients in the polyamide and release of fabricated articles from the molds may also be included. In addition solid lubricants which reduce wear on the fabricated articles in service may also be included. These include graphite and molybdenum disulphide.

Antimony oxide may be used, if desired, to enhance the effectiveness of the flame retardant. However, it tends to adversely affect the arc tracking resistance, but if used in amounts of less than 1 percent based on composition, antimony oxide may be present.

The compositions of the invention are normally prepared in a granular form for use in molding processes. Such granules are used for fabricating high strength articles with a high level of tracking resistance such as terminal blocks, switches and similar insulating parts in transformers and other electrical equipment and appliances.

The fire-retardant characteristics of the composition of the invention are determined using the Underwriters Laboratories Test Standard UL94. Using the Vertical Burning Test of this Standard the compositions of the invention should have a rating of 94VI or better when tested on samples having a thickness of 1/6 inch both when conditioned at a relative humidity of 50% for 48 hours or at 70° C. for 1 week.

The arc tracking resistance of the compositions is determined by the method set out in Underwriters Laboratories 746 (UL-746). The compositions when tested according to this method should have a comparative tracking resistance of at least 340 volts, and more desirably at least 400.

Tensile strength and elongation were determined as described in ASTM D-638.

Notched Izod was measured by the procedure described in ASTM D-256-73.

Flexural modulus was determined by ASTM D-790.

EXAMPLES AND CONTROLS

The examples and controls below were prepared using a 2½" single screw extruder with vented barrel. The polyamides and flame-retardant additives were mixed intimately in a suitable vessel followed by tumbling with the glass fibers. The mixture was melt blended in the extruder at between 260°-290° C. The melt temperature must be kept as low as possible to avoid possible decomposition of the additives. Normally the range 260°-280° C. is preferred. In a few instances a nylon concentrate containing 45% melamine was pre-extruded. This was then mixed with glass fibers and other additives in a subsequent extrusion.

The material exiting the die was quenched in water, cut into pellets, and sparged with nitrogen gas until cold to remove moisture.

The dried material was molded into test specimens using a 5- or 6-oz. screw injection molding machine.

All percentages are by weight.

The tables below set forth compositions and properties for various control and Examples of this invention and discuss their relationship.

The polyamide employed was nylon 66/6 (90/10) copolymer having a film-forming molecular weight.

The glass fibers employed were 3/16 inch long and had an aspect ratio of about 536.

The flame retardants employed are denoted as follows.

FR-1 is

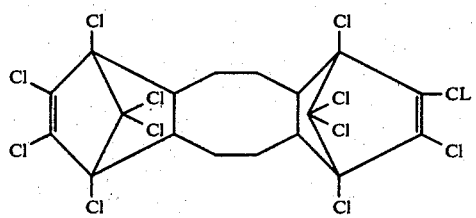

DBBE is decabromobiphenyl ether.

FR-2 is brominated polystyrene with a weight average molecular weight of about 135,000.

The number of seconds in parenthesis in the Tables below indicate the afterburn times.

TABLE 1

COMPOSITION

| Control | Polyamide % | Glass Fiber % | Melamine % | FR-1 % |
|---|---|---|---|---|
| A | 55 | 25 | 20 | — |
| B | 50 | 25 | 25 | — |
| C | 45 | 25 | 30 | — |
| D | 50 | 17 | 27 | 6 |
| E | 48 | 15 | 33 | 4 |

PROPERTIES

| Control | UL Flammability(1/16") 48/23/50 | 168/70 | Tens. Str. K Psi | M Pa | % Elongation |
|---|---|---|---|---|---|
| A | V2(73 sec) | V2(59 sec) | 21.7 | 149.6 | 3.0 |
| B | V2(48 sec) | V2(18 sec) | 20.3 | 140.0 | 2.9 |
| C | V2(53 sec) | V2(19 sec) | 19.3 | 133.1 | 2.6 |
| D | V2(11 sec) | VO(6 sec) | 15.4 | 106.2 | 2.6 |
| E | V2(7 sec) | VO(0 sec) | 12.5 | 86.2 | 2.3 |

| Control | Flexural Modulus K Psi | M Pa | Notched Izod ft-lb/in | J/m | Wet Arc Tracking Volts |
|---|---|---|---|---|---|
| A | 1303 | 8984 | 1.89 | 100.9 | >600 |
| B | 1441 | 9936 | 1.83 | 97.7 | >600 |
| C | 1560 | 10756 | 1.82 | 97.2 | >600 |
| D | 1138 | 7847 | 1.07 | 57.1 | 320 |
| E | 1167 | 8046 | 0.93 | 49.6 | 346 |

Controls A, B and C show that even up to 30% melamine alone is not sufficiently effective to afford even a V-1 rating. The rating of V-2 indicates that these materials produce flaming drips on burning. The arc tracking resistances of A, B, C compositions are over 600 volts.

The effects of adding FR-1 on flammability and arc tracking resistance are illustrated by Controls D and E. Although there was a great improvement in flame resistance, some tendency to drip was still apparent. Arc tracking resistance decreased to 320 V with 6% FR-1 and 346 V with 4% FR-1. Thus, high levels of FR-1 are detrimental to arc tracking resistance.

TABLE 1

COMPOSITION

| Example | Polyamide % | Glass Fiber % | Melamine % | FR-1 % | Zinc Borate (ZB) or Zinc Oxide (ZnO) |
|---|---|---|---|---|---|
| 1 | 50 | 20 | 27 | 2 | 1ZnO |
| 2 | 48 | 17 | 30 | 3 | 2ZnO |
| 3 | 48 | 15 | 33 | 3 | 1ZnO |
| 4 | 48 | 17 | 30 | 3 | 2ZB |
| 5 | 50 | 25 | 20 | 3 | 2ZB |
| 6 | 45 | 25 | 25 | 3 | 2ZB |
| 7 | 45 | 23 | 27 | 3 | 2ZB |
| 8 | 49 | 25 | 16 | 6 | 4ZB |
| 9 | 47 | 25 | 18 | 6 | 4ZB |
| 10 | 49 | 25 | 18 | 4 | 4ZB |
| 11 | 47 | 25 | 20 | 4 | 4ZB |
| 12 | 47 | 25 | 20 | 5 | 3ZB |
| 13 | 45 | 25 | 25 | 3 | 2ZB |

PROPERTIES

| Example | UL Flammability(1/16") 48/23/50 | 168/70 | Tens. Str. K Psi | M Pa | % Elongation |
|---|---|---|---|---|---|
| 1 | VO(42 sec) | VI(41 sec) | 15.0 | 103.4 | 2.0 |
| 2 | VO(5 sec) | VO(9 sec) | 13.2 | 91.0 | 1.8 |
| 3 | VO(7 sec) | VO(3 sec) | 12.5 | 86.2 | 1.8 |
| 4 | VO(17 sec) | VO(17 sec) | 13.1 | 90.3 | 1.8 |
| 5 | VI(73 sec) | VI(59 sec) | 17.4 | 120.0 | 2.3 |
| 6 | VO(19 sec) | VO(19 sec) | 16.3 | 112.4 | 1.8 |
| 7 | VO(18 sec) | VO(10 sec) | 16.1 | 111.0 | 1.8 |
| 8 | VI(90 sec) | VI(54 sec) | 19.2 | 132.4 | 2.2 |
| 9 | VO(37 sec) | VI(37 sec) | 19.3 | 133.1 | 2.2 |
| 10 | VI(87 sec) | VI(108 sec) | 19.3 | 133.1 | 2.1 |
| 11 | VI(96 sec) | VI(37 sec) | 19.2 | 132.4 | 2.2 |
| 12 | VO(23 sec) | VO(23 sec) | 18.6 | 128.2 | 2.1 |
| 13 | VI(55 sec) | VO(21 sec) | 19.1 | 131.7 | 2.2 |

| Example | Flexural Modulus K Psi | M Pa | Notched Izod ft-lb/in | J/m | Wet Arc Tracking Volts |
|---|---|---|---|---|---|
| 1 | 1265 | 8722 | 1.00 | 53.4 | 426 |
| 2 | 1177 | 8115 | 0.79 | 42.1 | 420 |
| 3 | 1168 | 8053 | 0.69 | 36.8 | 511 |
| 4 | 1192 | 8219 | 0.70 | 37.4 | 435 |
| 5 | 1330 | 9170 | 1.22 | 65.1 | 430 |
| 6 | 1441 | 9936 | 1.29 | 68.9 | 450 |
| 7 | 1469 | 10129 | 1.31 | 69.9 | 440 |
| 8 | 1377 | 9494 | 1.46 | 77.9 | 443 |
| 9 | 1495 | 10308 | 1.44 | 76.9 | 417 |
| 10 | 1417 | 9770 | 1.45 | 77.4 | 400–440 |
| 11 | 1389 | 9577 | 1.38 | 73.7 | 442 |
| 12 | 1452 | 10012 | 1.43 | 76.3 | 451 |
| 13 | 1486 | 10246 | 1.50 | 80.1 | 503 |

The use of small amounts of zinc oxide or zinc borate prevents formation of flaming drips as shown by Examples 1 through 13. The lower amounts of FR-1 (2% to 6%) afforded arc tracking resistance greater than 400 volts.

Examples 5 through 7 explore the effect of melamine level at constant levels of FR-1 (3%) and zinc borate (2%). A V-0 rating was obtained with 25% melamine and arc tracking resistance of greater than 435 V.

Examples 8 through 13 show in more detail the effects of melamine, FR-1, and zinc borate on flammability and arc resistance. To obtain V-0 rating at least 20% melamine is required at 5% FR-1 and 3% zinc borate. It is apparent that lesser amounts of melamine are required with higher levels of FR-1 and zinc borate.

TABLE III

COMPOSITION

| Control | Polyamide % | Glass Fiber % | Melamine | DBBE | Zinc Borate |
|---|---|---|---|---|---|
| F | 44 | 25 | 25 | 4 | 2 |
| G | 45 | 27 | 18 | 6 | 4 |
| H | 46 | 30 | 14 | 6 | 4 |

PROPERTIES

| Control | UL Flammability(1/16″) 48/23/50 | 168/70 | Tens. Str. K Psi | M Pa | % Elongation |
|---|---|---|---|---|---|
| F | VO(24 sec) | VI(25 sec) | 16.4 | 113.1 | 1.5 |
| G | VO(31 sec) | VI(36 sec) | 18.7 | 128.9 | 1.8 |
| H | V1(104 sec) | VI(119 sec) | 21.2 | 146.2 | 1.8 |

| Control | Flexural Modulus K Psi | M Pa | Notched Izod ft-lb/in | J/m | Wet Arc Tracking Volts |
|---|---|---|---|---|---|
| F | 1430 | 9860 | 1.10 | 58.7 | 250–300 scatter |
| G | 1483 | 10225 | 1.22 | 65.1 | scatter |
| H | 1579 | 10887 | 1.32 | 70.5 | 280–340 scatter |

The effect of replacing FR-1 with decabromobiphenyl ether (DBBE) is shown by Controls F, G and H. From the results it is seen that DBBE is less effective than FR-1 but more importantly the arc tracking resistances were low and values were erratic and scattered.

TABLE IV

COMPOSITIONS

| Example or Control | Polyamide % | Glass Fiber % | Melamine % | FR-1 % | Zinc Borate % |
|---|---|---|---|---|---|
| I | 47 | 25 | 25 | 3 | — |
| J | 48 | 25 | 25 | — | 2 |
| 14 | 45 | 25 | 25 | 3 | 2 |

PROPERTIES

| Example or Control | UL Flammability(1/16″) 48/23/50 | 168/70 | Tens. Str. K Psi | M Pa | % Elongation |
|---|---|---|---|---|---|
| I | V2(82) | V2(95) | 19.8 | 136.5 | 2.5 |
| J | V2(181) | V2(156) | 19.5 | 134.5 | 2.2 |
| 14 | VO(15) | VI(65) | 18.8 | 129.6 | 2.2 |

| Example or Control | Flexural Modulus K Psi | M Pa | Notched Izod ft-lb/in | J/m | Wet Arc Tracking Volts |
|---|---|---|---|---|---|
| I | 1436 | 9901 | 1.43 | 76.3 | 393 |
| J | 1426 | 9832 | 1.43 | 76.3 | >600 |
| 14 | 1568 | 10811 | 1.51 | 80.6 | 520–540 |

Control I with 25% melamine and 3% FR-1 was V-2 and had an arc tracking resistance of 393 V. Control J, containing 25% melamine and 2% zinc borate was V-2, however, the arc resistance was greater than 600 V. Example 14 containing 25% melamine, 3% FR-1, and 2% zinc borate was V-0/V-1 and had an arc resistance of 520–540 V. Controls I and J illustrate that to obtain the good flammability resistance the three components—melamine, FR-1 and zinc borate—must be present. The absence of one component results in poor flame resistance.

TABLE V

COMPOSITION

| Example | Polyamide % | Glass Fiber % | Melamine % | Compound % | Flame Retardant % | Zinc Borate % | Antimony oxide % |
|---|---|---|---|---|---|---|---|
| 15 | 45 | 25 | 25 melamine cyanurate | | 3FR-1 | 2 | — |
| 16 | 48 | 20 | 25 melamine | | 4FR-1 | 3 | — |
| 17 | 47.3 | 20 | 25 melamine | | 5FR-1 | 3 | 0.7 |
| 18 | 46.3 | 20 | 25 melamine | | 5FR-1 | 3 | 0.7 |

PROPERTIES

| Example | UL Flammability(1/16″) 48/23/50 | 168/70 | Tens. Str. K Psi | M Pa | % Elongation |
|---|---|---|---|---|---|
| 15 | VO(6) | VI(31) | 16.9 | 116.5 | 2.0 |
| 16 | VO(4) | VO(18) | 17.1 | 117.9 | 2.3 |
| 17 | VO(4) | VO(10) | 16.9 | 116.5 | 2.1 |
| 18 | VO(5) | VO(19) | 17.0 | 117.2 | 2.1 |

| Example | Flexural Modulus K Psi | M Pa | Notched Izod ft-lb/in | J/m | Wet Arc Tracking Volts |
|---|---|---|---|---|---|
| 15 | 1478 | 10191 | 1.40 | 74.7 | 546 |
| 16 | 1361 | 9384 | 1.31 | 69.9 | 501 |
| 17 | 1357 | 9357 | 1.35 | 72.1 | 419 |
| 18 | 1381 | 9522 | 1.33 | 71.0 | 460–480 |

Example 15 provides an Example using melamine cyanurate in place of melamine.

Examples 16 and 17 provide Examples using antimony oxide ($Sb_2O_3$); while Example 18 employs brominated polystyrene as the organic flame retardant.

I claim:

1. A reinforced, flame-retardant, arc track resistant composition consisting of
   (a) 40–65 weight percent of composition of a polyamide of film-forming molecular weight,
   (b) 16–35 weight percent of composition of melamine, melam, melamine cyanurate or a melamine derivative represented by the formula

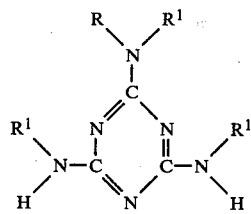

where R and $R^1$ may be the same or different and represent hydrogen, lower alkyl (alkyl of 1–6 carbons), phenyl, tolyl or halo-phenyl, provided that not all the R and $R^1$ groups can be hydrogen,
   (c) 1–7 weight percent of composition selected from the class consisting of a chlorinated compound obtained from condensation of two moles of perchlorocyclopentadiene and one mole of 1,5-cyclooctadiene, or a brominated polystyrene.
   (d) 1–4.9 weight percent of composition of zinc borate or zinc oxide
   (e) 5–30 weight percent of composition of glass fibers, the percent amounts of components (a) through (e) totaling 100% with respect to one another.

2. The composition of claim 1 wherein component (b) is melamine.

3. The composition of claim 1 wherein component (c) is the chlorinated compound obtained from condensation of two moles of perchlorocyclopentadiene and one mole of 1,5-cyclooctadiene.

4. The composition of claim 1 wherein component (d) is zinc borate.

5. The composition of claim 3 or 4 wherein component (b) is melamine.

6. The composition of claims 2 or 4 wherein component (c) is the chlorinated compound obtained from condensation of two moles of perchlorocyclopentadiene and one mole of 1,5-cyclooctadiene.

7. The composition of claims 2 or 3 wherein component (d) is zinc borate.

8. The composition of claim 1 wherein component (b) is melamine (c) is the chlorinated compound obtained from condensation of two moles of perchlorocyclopentadiene and one mole of 1,5-cyclooctadiene, and (d) is zinc oxide.

9. The composition of claim 1, 2, 3 or 4 wherein component (c) is a brominated styrene.

* * * * *